United States Patent [19]

Schmidt et al.

[11] Patent Number: 5,077,641

[45] Date of Patent: Dec. 31, 1991

[54] HEADLIGHT FOR POWER VEHICLE

[75] Inventors: Hans-Joachim Schmidt, Ditzingen; Klaus Jahnel, Stuttgart; Reiner Jocher, Aidlingen; Horst Dahm, Ostelsheim, all of Fed. Rep. of Germany

[73] Assignee: Robert Bosch GmbH, Stuttgart, Fed. Rep. of Germany

[21] Appl. No.: 532,392

[22] Filed: Jun. 1, 1990

[30] Foreign Application Priority Data

Jun. 1, 1989 [DE] Fed. Rep. of Germany ....... 3917813

[51] Int. Cl.⁵ ............................................. B60Q 1/04
[52] U.S. Cl. ..................................... 362/61; 362/226; 362/287; 362/430
[58] Field of Search .................. 362/61, 80, 226, 285, 362/287, 288, 306, 428, 427, 430

[56]  References Cited

U.S. PATENT DOCUMENTS

| 2,403,904 | 7/1946 | Blomberg | 362/80 |
| 4,471,411 | 9/1984 | Graham et al. | 362/269 |
| 4,866,577 | 9/1989 | Jocher et al. | 362/288 |
| 4,937,712 | 6/1990 | Caffin et al. | 362/287 |

Primary Examiner—Ira S. Lazarus
Assistant Examiner—D. M. Cox
Attorney, Agent, or Firm—Michael J. Striker

[57]  ABSTRACT

A headlight for a power vehicle has a housing connectable with a vehicle body, a holding frame accommodated in the housing adjustably relative to the latter and a reflector which is turnably connectable with the holding frame and turnable outwardly from a position in which it is arrested with the holding frame. The reflector has a rear side and is provided with light sources insertable into the rear side of the reflector. The housing has a rear upper side and is provided at the rear upper side with an opening. The reflector is turnable about a horizontal axis extending in its upper region so that the rear side of the reflector with the light sources is turnable toward the opening from the holding frame.

17 Claims, 1 Drawing Sheet

U.S. Patent     Dec. 31, 1991     5,077,641
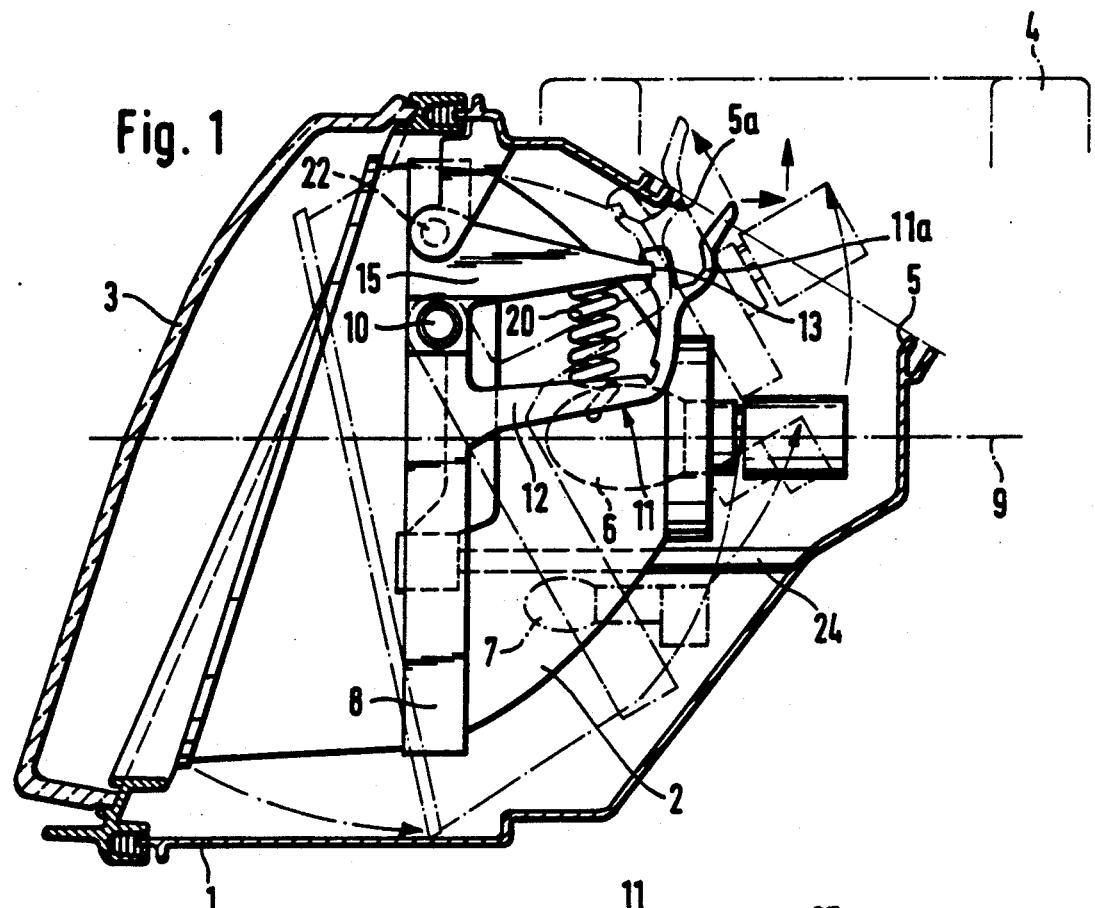
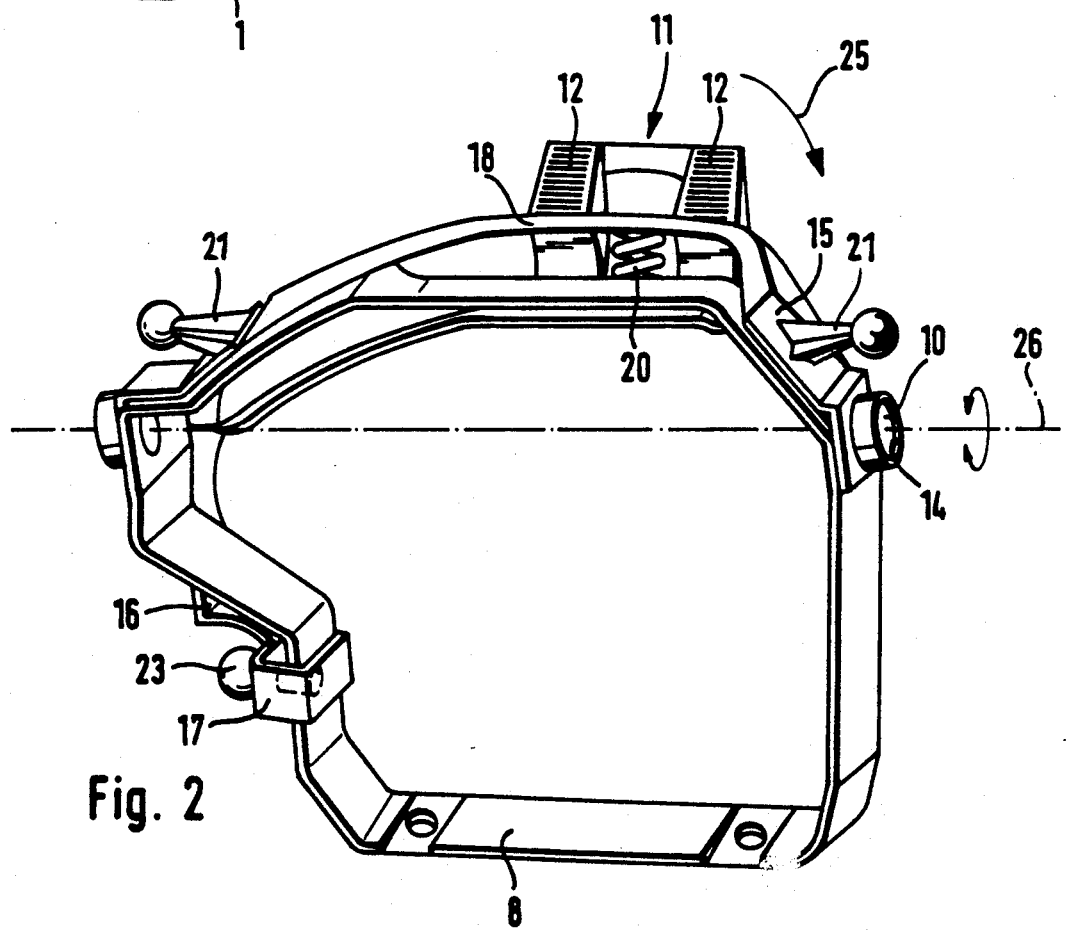

HEADLIGHT FOR POWER VEHICLE

BACKGROUND OF THE INVENTION

The present invention relates to headlights for power vehicle.

More particularly, it relates to such a headlight which a housing mounted on a vehicle body, a holding frame adjustably arranged in the housing, and a reflector turnably connected with the holding frame and having light sources insertable through its rear side.

Headlights of the above mentioned general type are known in the art. One of such headlights is disclosed for example in the German reference DE-OS 3,402,274. In this headlight the reflector is arranged in the housing and covered with a light disc at its front side. The reflector is turnably arranged in a frame by means of a hinge, and the frame is adjustably connected to the housing of the headlight. The reflector is arrestable in the frame by an arresting connection. The light disc is releasably connected with the housing by another arresting connection. The reflector is turnable forwardly from the frame for the lamp exchange after removing of the light disc and releasing the arresting connection. In this manner a lamp exchange is possible even with poor accessibility to the rear side of the headlight or when only small mounting depth is available. However, the reflector is turnable only after releasing and removing of the light disc, which is of course disadvantageous. The releasable mounting of the light disc is connected with high manufacturing expenses and also leads to sealing problems for the headlight.

SUMMARY OF THE INVENTION

Accordingly, it is an object of the present invention to provide a headlight which avoids the disadvantages of the prior art.

More particularly, it is an object of the present invention to provide a headlight in which a simple lamp exchange is possible for the rear side of the headlight. The reflector is turnable rearwardly and upwardly and therefore a releasable light disc is no longer necessary. As a results the respective disadvantages involving high manufacturing expenses and sealing problems are eliminated.

In keeping with these objects and with others which will become apparent hereinafter, one feature of the present invention resides, briefly stated, in a headlight of the above mentioned general type in which the housing is provided with an opening on its rear upper side, and the reflector is turnable with its rear side provided with the light sources toward the opening from the holding frame about an axis which extends horizontally in its upper region.

When the headlight is designed in accordance with the present invention, it eliminates the disadvantages of the prior art and provides for the above listed advantages.

In accordance with another feature of the present invention, the reflector in its turned position is located so that its rear side with the light sources is in the region of the opening of the housing.

Still another feature of the present invention is that the reflector is connected with the holding frame through a turning frame which at least partially surround the reflector.

An especially simple construction of the holding frame and the turning frame is provided when the holding frame surrounds the reflector and the turning frame from their sides in a U-shaped manner as seen from above, and the turning frame is connected with the holding frame through laterally projecting pins on the turning frame and the receptacles on the holding frame.

In accordance with a further feature of the present invention, the holding frame is connected with the housing by laterally projecting partially spherical frame pins and partially spherical housing receptacles. The holding frame can be provided with a support extending toward the optical axis of the headlight and having a spherical head for connecting with the housing, wherein the spherical head is connected with an adjusting device.

The support can have an abutment for abutting against the turning frame in order to fix the reflector in its operational position in which it is turned away of the opening of the housing.

An especially simple and reliable arresting connection of the turning frame with the holding frame is obtained when a spring lever is formed on the rear side of the turning frame and engages in a groove of a part of the holding frame.

Further, the turning frame can be spring-loaded by a pulling spring toward its turning-out position. As a result, after releasing the arresting connection the reflector is turned outwardly from the holding frame.

The pulling spring can be located between the spring lever and the holding frame.

Finally, the spring lever can have an actuating part extending outwardly beyond the groove and abutting against the opening-limiting edge of the housing in the turning-out position of the turning frame.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a longitudinal section of a headlight in accordance with the present invention, in a simplified manner; and FIG. 2 is a view showing a holding frame and a turning frame of the headlight of FIG. 1.

DESCRIPTION OF THE PREFERRED EMBODIMENTS

A headlight in accordance with the present invention has a housing which is identified as a whole with reference numeral 1, a reflector 2 arranged in the housing, and a light disc 3 which closes the housing at its front side. The headlight is mounted on a partially shown body 4 of a power vehicle in a manner which is not described in detail. The body provides for an access to the headlight and in particular to its rear side from above in an inclined direction. The housing 1 in this region has an opening 5 which is closeable by a not shown protective hood. Light sources 6 provide for producing the standing light, low beam light and high beam light, inserted in the reflector 2 from its rear side and provided with a contact by means of a plug. When the headlight must operate must operate as a fog reflector, the light source 7 required for this purpose is also inserted from the rear side of the reflector 2 and provided with a contact by means of a further plug.

The reflector 2 is fixedly connected with a turning frame 8 which completely surrounds the reflector 2 perpendicularly to its optical axis 9. A pin 10 extends outwardly from the turning frame 8 at each side in its upper region. A spring lever 11 is formed on the rear side of the turning frame 8 in its upper region. The spring lever 11 includes a rigid arm 12 projecting from the turning frame 8 and an elastically deformable actuating part 11a is connected with the arm 12.

The turning frame 8 is rotatably connected with a holding frame 15 by the pins 10 which extend in opening 14 of the holding frame 15 and lie on a common horizontal axis 26. The holding frame 15 engages the turning frame 8 on its rear side in a U-shaped manner as seen from above. The openings 14 are provided in the legs of the holding frame 15. A support 16 is formed on the holding frame 15. The support 16 extends on one leg outwardly beyond the openings 14 and projects to the optical axis 9 of the headlight. A claw 17 is provided on the end of the support 16. The turning frame 8 is guided in the claw 17 and comes to abutment with its front side against the closed end of the claw 17. The spring lever 11 of the turning frame 8 is engageable with a central part 18 of the holding frame 15 projecting towards the rear side of the turning arm 8, by means of a groove 13. A pulling spring 20 is provided between the turning frame 8 and the central part 18 of the holding frame 15. It can also be between the spring lever 11 or the turning frame 8 and the housing 1.

The holding frame 15 is arranged in the housing 1 adjustably in horizontal and vertical directions. Two bearings positions of the holding frame 15 are formed by spherical pins 21 which laterally project in its upper region and corresponding to spherical pin receptacles 22 formed in the housing 1. One spherical pin receptacle 22 is displaceable relative to the housing 1 for allowing a horizontal adjustment of the holding frame 15. A spherical head 23 is formed on the outer side of the claw 17. An adjusting device 24 for vertical adjustment of the holding frame 15 engages with the spherical head 23.

The light sources 6 and 7 which are insertable from the rear side in the reflector 2, the spring lever 11 is depressed in direction of the arrow 25 and the reflector 2 together with the turning frame 8 is turned about an axis 26 defined by the pins 10, outwardly from the holding frame 15 toward the opening 5 in the housing 1.

After releasing of the arresting connection, the reflector 2 is pulled by the pulling spring 20 from its operational position to the turning-out position shown in a dash-dot line in FIG. 1. The actuation part 11a of the spring lever 11 lies then at the edge 5a of the opening 5 so that the reflector cannot be completely removed from the housing 1. In this position it is possible to pull out the plug and then to exchange the light sources 6 and 7 through the opening 5. The opening 5 can be closed with the protective hood when the reflector 2 is again turned to its operational position and then arrested with the holding frame 15 through the turning frame 8, since the lever 11 in the turned-out position extends outwardly through the opening 5.

It will be understood that each of the elements described above, or two or more together, may also find a useful application in other types of constructions differing from the types described above.

While the invention has been illustrated and described as embodied in a headlight for a power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for a power vehicle, comprising a housing connectable with a vehicle body and having a horizontal axis; a holding frame accommodated in said housing adjustably relative to the latter; and a reflector which is turnably connectable with respect to said holding frame and turnable outwardly from a position in which it is arrested with said holding frame, said reflector having a rear side and being provided with light sources insertable into said rear side of said reflector, said housing having a rear upper side and being provided at said rear upper side with an opening having an axis which is inclined upwardly relative to said horizontal axis said reflector being turnable about said horizontal axis so that said rear side of said reflector with said light sources is turnable toward said opening from said holding frame for exchanging said light sources through said opening at the rear upper side of said housing along said inclined axis.

2. A headlight as defined in claim 1; and further comprising means for adjustably arranging said holding frame in said housing.

3. A headlight as defined in claim 1; and further comprising means for arrestably connecting said reflector with said holding frame in said position in which it is arrested with said holding frame.

4. A headlight as defined in claim 1, wherein said reflector in said position in which it is turned toward said opening of said housing is located so that said rear side provided with said light sources lies in the region of said opening of said housing.

5. A headlight for a power vehicle, comprising a housing connectable with a vehicle body; a holding frame accommodated in said housing adjustably relative to the latter; a reflector which is turnably connectable with said holding frame and turnable outwardly from a position in which it is arrested with said holding frame, said reflector having a rear side and being provided with light sources insertable into said rear side of said reflector, said housing having a rear upper side and being provided at said rear upper side with an opening, said reflector being turnable about a horizontal axis extending in its upper region so that said rear side of said reflector with said light sources is turnable toward said opening from said holding frame; and a turning frame to turn said reflector with said holding frame.

6. A headlight as defined in claim 5, wherein said turning frame is formed as a ring which at least partially surrounds said reflector.

7. A headlight as defined in claim 5, wherein said turning frame has a rear side, said holding frame surrounding said rear side of said reflector and said rear side of said turning frame being U-shaped as seen from above.

8. A headlight as defined in claim 7; and further comprising means for connecting said turning frame with said holding frame, said connecting means including pins laterally projecting from said turning frame and receptacles provided on said holding frames and receiving said pins.

9. A headlight as defined in claim 5; and further comprising means for adjusting said holding frame relative to said housing, said adjusting means including an adjusting device, and a support extending from said holding frame toward an optical axis of the headlight and provided with a head connected with said adjusting device.

10. A headlight as defined in claim 9, wherein said head of said support of said holding frame has a partially spherical shape.

11. A headlight as defined in claim 9, wherein said support is provided with an abutment arranged to abut against said turning frame for fixing said reflector in its operational position in which it is directed away of said opening.

12. A headlight as defined in claim 5, wherein said holding frame has a part provided with a groove, said turning frame having a rear side provided with a spring lever engageable in said groove.

13. A headlight as defined in claim 12, wherein said turning frame is turnable to a turning-out position; and further comprising a pulling spring urging said turning frame toward said turning-out position.

14. A headlight as defined in claim 13, wherein said pulling spring is arranged between said spring lever and said holding frame.

15. A headlight as defined in claim 12, wherein said housing has an edge which limits said opening, said spring lever having an actuating part which extends outwardly beyond said groove and comes to abutment against said edge of said housing in said turning-out position of said turning frame.

16. A headlight for a power vehicle, comprising a housing connectable with a vehicle body; a holding frame accommodated in said housing adjustably relative to the latter; a reflector which is turnably connectable with said holding frame and turnable outwardly from a position in which it is arrested with said holding frame, said reflector having a rear side and being provided with light sources insertable into said rear side of said reflector, said housing having a rear upper side and being provided at said rear upper side with an opening, said reflector being turnable about a horizontal axis extending in its upper region so that said rear side of said reflector with said light sources is turnable toward said opening from said holding frame; and means for joining said holding frame with said housing, said joining means including two frame pins extending laterally from said holding frame in its upper region and two housing receptacles provided on said housing and receiving said pins.

17. A headlight as defined in claim 15, wherein said frame pins and said housing receptacles have a partially spherical shape.

* * * * *